Sept. 16, 1969 H. K. HAUSER 3,467,461
CABINET SECURING MECHANISM
Filed July 17, 1967 2 Sheets-Sheet 1

INVENTOR.
HENRY K. HAUSER
BY Thomas Glenn Keough
[signature]
ATTORNEYS

Sept. 16, 1969 H. K. HAUSER 3,467,461

CABINET SECURING MECHANISM

Filed July 17, 1967 2 Sheets-Sheet 2

INVENTOR
HENRY K. HAUSER

BY Thomas Glenn Keough

ATTORNEYS 3,467,461
CABINET SECURING MECHANISM
Henry K. Hauser, San Diego, Calif., assignor to the United States of America as represented by the Secretary of the Navy
Filed July 17, 1967, Ser. No. 654,012
Int. Cl. A47b 88/00
U.S. Cl. 312—333 6 Claims

ABSTRACT OF THE DISCLOSURE

The present invention relates to heavy duty cabinets having an extensible chassis and, more particularly, to a mechanism for securing an extensible chassis securely within a cabinet. A plurality of peripherally disposed tapered guide pins frictionally fit into a plurality of correspondingly disposed pin keepers and at least one bidirectional slotted cam mounted on the cabinet and a roller pin carried on the chassis coact to overcome a frictional force when withdrawing or inserting the chassis in the cabinet. A pair of longitudinally extending cam assemblies carried on the chassis outer cover mechanically cooperate with bolt keepers mounted on the cabinet to create an interconnection between the chassis assembly and the cabinet which approaches the strength of a cabinet structural wall member. The invention is particularly related to such heavy duty cabinets housing electronic components preferably contained within electronic modules which must, as the design criteria calls for, ensure negligible or minimum exposure of the modules to the ambient effects of vibration and shock. Also to be included in such cabinets are control devices for maintaining a constant environment as to humidity and temperature.

The invention described herein may be manufactured and used by or for the Government of the United States of America for governmental purposes without the payment of any royalties thereon or therefor.

BACKGROUND OF THE INVENTION

A suitable cabinet having an extensible chassis mounting electronic modules long has been sought by electronic designers and technicians, such a cabinet permitting servicing of the modules while still protecting the modules from the effect of shock and vibration. In particular, the need is urgent in military applications where adverse conditions and inherent environmental vibrations and shock disable a relatively high percentage of operational electronics. Some cabinets provide extensibility for servicing. However, upon reinsertion, the latching mechanisms do not securely hold the chassis and thus permit damaging vibration. Other conventional cabinets while having outer doors that bolt on the cabinets passing no vibration, do not permit free access to the modules.

SUMMARY OF THE INVENTION

The present invention is directed to providing a mechanism for securing an extensible chassis in a cabinet permitting an interconnection therebetween which closely approximates the strength of a structural side wall member of the cabinet. Included are a plurality of tapered pins mounted on the chassis frictionally fitting into a plurality of keeper holes provided on the cabinet and a pair of cam bolt assemblies carried on the chassis laterally displacing a plurality of bolts to engage a plurality of bolt keepers longitudinally mounted on the cabinet. A U-shaped handle pivotally mounted on the chassis and extending from the front of the cabinet, mounts a pair of roller pins which engage a pair of bidirectional slotted cams to overcome the frictional force between the pins and the keeper holes when the handle is raised or lowered.

Simultaneously, through appropriate linkage, the cam bolt assemblies are longitudinally displaced to withdraw the bolts from the bolt keepers when the handle is raised or insert the bolts into the bolt keepers when the handle is lowered. When the chassis is within the cabinet and the handle is depressed, the mechanical cooperation between the pins and holes and bolts and bolt keepers provides a secure chassis-cabinet interconnection that serves to isolate electronic modules mounted on the extensible chassis from the ambient effects of vibration and shock.

It is the primary object of the invention to provide a mechanism for securing an extensible chassis in a cabinet which approaches the structural equivalency of a side wall member of the cabinet.

Another object of the invention is to provide a secure interconnection between a heavy duty chassis and cabinet which permits easy opening and closing.

A further object of the invention is to provide a mechanism for securing a chassis within a cabinet that involves only one operational step by the operator to open or close the chassis.

An ultimate object of the invention is to provide a securing mechanism being relatively simple in construction and rugged to permit extensive reliable service under extreme adverse conditions such as those encountered in the military aboard ships and aircraft.

Figure 5:
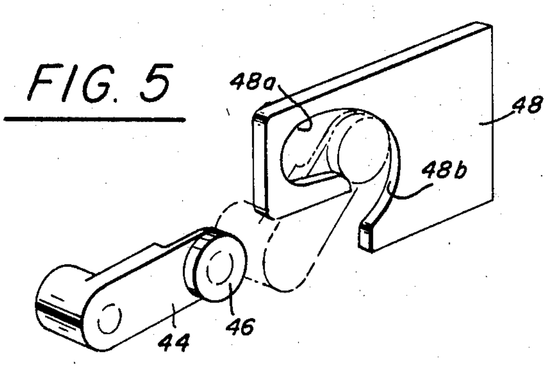
Figure 3:
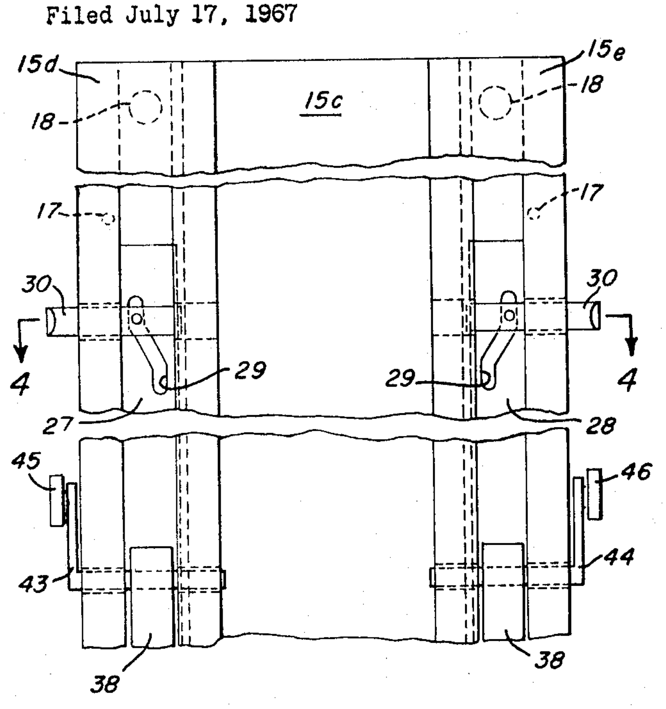
FIG. 3 is a front view of the outer panel of the chassis partially in section showing the interconnection of various elements.
Figure 4A:
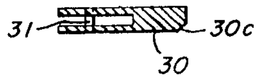
FIG. 4 is a cross sectional view of FIG. 3 taken along lines 4—4 in FIG. 3.
Figure 4:
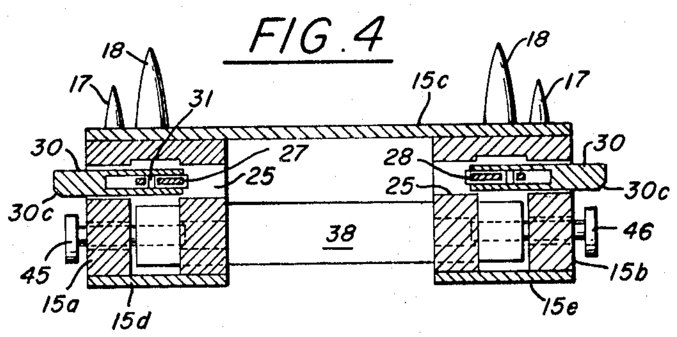
Figure 4B:
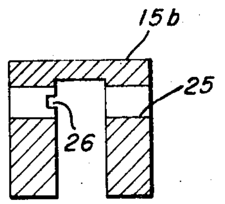
Figure 2:
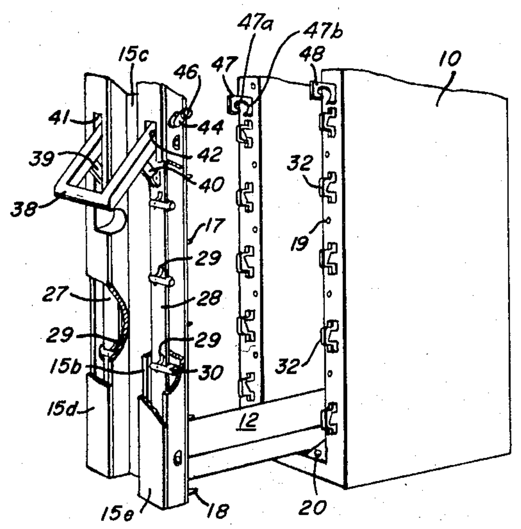
FIG. 2 is a perspective view of the extended chassis of FIG. 1 being partially in the section.

FIG. *4a* is a cross sectional view of a single cam bolt taken along line 4—4;

FIG. *4b* is a cross sectional view of a single channel member showing a cam guide slot;

FIG. 5 is a side view of a bidirectional cam and its associated roller pin.

PREFERRED EMBODIMENT OF THE INVENTION

Figure 1:
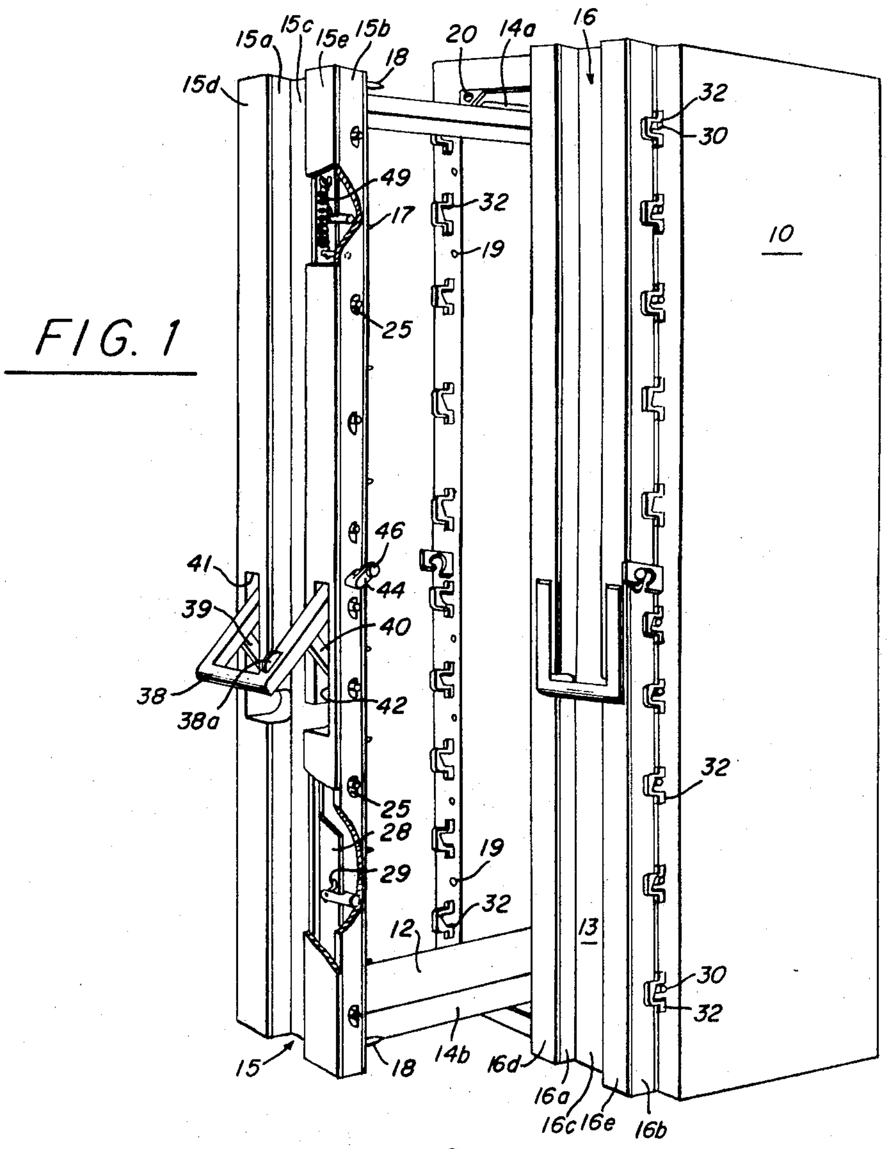
FIG. 1 is a perspective view of a cabinet having one extensible chassis entirely within the cabinet and another extensible chassis partly extended.

Referring now to the drawings, FIG. 1 shows an enclosing cabinet 10 that is particularly adapted to housing electronic components or modules. To ensure maximum strength at a minimum weight, the cabinet is constructed from a lightweight alloy that includes a frame of square tubular extrusions joined with corner forgings to provide a framework for side, rear, top, and bottom panels. By being so constructed, the cabinet is ideally suited to be mounted in a free standing relationship (being connected to the deck or floor at the base of the enclosure only). Connection through the base enables the cabinet to better withstand external vibration, shock, and torsional effects as opposed to a similar enclosure being longitudinally mounted on a wall.

The cabinet is provided with a pair of extensible chassis 12 and 13 each being supported from the cabinet by a pair of heavy duty slides 14*a* and 14*b*. Each chassis is adapted to support electronic modules and similar devices by including with a plurality of cross members, not shown, extending inwardly of outer panels 15 and 16. The outer panels are of an alloy construction formed of a pair of longitudinally extending channel members 15*a*, 15*b*, 16*a*, and 16*b* carried on outer elements 15*c*, and 16*c*. Each channel member is closed by an elongate member 15*d*, 15*e*, 16*d* or 16*e* and secured thereto by a plurality of bolts.

To avoid redundancy, the specification will deal with the apparatus and mechanisms forming extensible chassis 12, it being understood that chassis 13 is similarly constructed and performs the same function.

On the inner surface of each of the outer elements a plurality of tapered pins 17 and 18 are disposed in tapped holes and extend inwardly from the outer panels toward a plurality of equally spaced opposed pin keepers 19 and 20. The pins and keepers provide a means for guiding, frictionally holding, and securing the chassis within the cabinet. It has been found that due to accumulated mechanical tolerances, a misalignment of the tapered pins to the pin keepers produces the favorable result of enhancing the frictional interconnection between the chassis and the cabinet. Also, since lateral torsional stresses exceed those produced by vibration and shock, tapered pins 18 and respectively associated pin keepers 20 are larger to minimize these stresses.

Each of channel members **15*a* and 15*b* are provided with a plurality of traverse holes 25 equally spaced from one another and a longitudinally extending camming bar guide 26 restricting a longitudinally extending camming bar 27 or 28 to a reciprocal motion. Each camming bar is formed with a plurality of diagonal cam slots 29 spaced from one another to longitudinally alternate with tapered pins 17**.

Separate ones of a plurality of cam bolts 30 are disposed within individual traverse holes 25 and are capable only of a lateral motion inwardly and outwardly of the outer panel. Each cam bolt is provided with a channeling slot **30*a* sized to receive a camming bar and a follower post 30*b*** sized to slideably fit within a separate one of the cam slots for imparting the inwardly and outwardly motion when the associated camming bar is longitudinally displaced.

Mounted about the cabinet opening and alternating with the pin keepers, a plurality of bolt keepers 32 are secured and disposed to positively receive individual ones of the cam bolts to ensure locking and unlocking of the chassis within the cabinet. To facilitate the locking and unlocking action, the cam bolts are formed with slant surfaces **30*c***.

A U-shaped handle 38 extends through members **15*d* and 15*e* and is pivotally carried by channel members 15*a* and 15*b*. A pair of push rods 39 and 40 are individually disposed on opposite legs of the handle and extend through a pair of openings 41 and 42 to pivotally engage respective ones of camming bars 27 and 28**. The pivotal mounting of the push rods on the handle and the camming bars ensures a reciprocal camming bar motion when the handle is raised and lowered.

A roller pin arm 43 or 44 is coextensively affixed on a separate one of the legs of the handle and reaches inwardly through the outer panel on opposite sides. Each arm mounts a roller pin 45 or 46 operatively opposed to one of a pair of bidirectional cams 47 and 48 secured onto the cabinet. Each cam is provided with a close strike **47*a* or 48*a* and a break strike 47*b* or 48*b***. The chassis and cabinet are pulled together when each roller pin abuts its associated close strike and the handle is depressed. The chassis and cabinet are pushed apart when each roller pin abuts its associated break strike and the handle is raised. The resulting pushing or pulling force is necessary in the instant invention to overcome the frictional drag existing between the tapered pins and the pin keepers. Thus, it can be seen that removal or insertion of the chassis can be easily accomplished with relatively little force by merely raising or lowering the U-shaped handle.

With the chassis entirely within the cabinet as shown by chassis 13, the combined mechanical coaction of the tapered pins with the pin keepers, and of the cam bolts with the bolt keepers provides a secure chassis-cabinet interconnection. This interconnection does not allow the electronic module mounting chassis to be rattled loosely or shocked from external sources but, rather, isolates the modules to permit more reliable operation.

Operation of the securing mechanism is easily performed to disengage the locked cam bolts and bolt keepers and to overcome the frictional force between the tapered pins and pin keepers by merely raising the handle. Raising the handle rotates roller pins 45 and 46 to abut the break strikes **47*b* and 48*b* to exert an outward force on the chassis 12. Simultaneously, push rods 39 and 40 transmit a vertical longitudinally-displacing force on camming bars 27 and 28 causing a lateral displacement of the cam bolts associated with each camming bar. Here it should be pointed out that the lateral displacement of the cam bolts associated with camming bar 27 and the cam bolts associated with camming bar 28** are inwardly in opposite directions to simultaneously withdraw all the cam bolts from the bolt keepers. Continued upward motion of the handle completely disengages the cam bolts and forces the tapered pins from the pin keepers to permit a relatively effortless withdrawal of the chassis from the cabinet.

Replacing the chassis within the cabinet follows a similar procedure in which the chassis is pushed into the cabinet until roller pins 45 and 46 enter the slot provided in each of the bidirectional cams 47 and 48. Depressing the U-shaped handle causes roller pins 45 and 46 to come in contact with close strikes **47*a* and 48*a*. Further downward motion by the handle produces a strong inward pulling force on the chassis which enables the tapered pins to overcome a resistive frictional force of the pin keepers. The continued downward motion of the handle additionally imparts a vertically downward force on push rods 39 and 40 to displace camming bars 27 and 28** to outwardly cam in opposite directions the cam bolts associated with each of the camming bars. Upon positioning the handle to a substantially flush relationship with the outer panel, a secure interconnection between cabinet and chassis again exists by reason of the simultaneous interlocking of the cam bolts and bolt keepers and the secure frictional fitting between the tapered pins and pin keepers.

Note, that as a safety feature and to ensure smooth operation, a camming bar spring 49 may have been included to bias the bolts in a locking relationship. As a further safety feature, a snap **38*a*** has been included on the handle to hold the bar in its flush relationship on the outer panel.

In one preferred form the channel members **15*a*, 15*b*, 16*a*, and 16*b***, in addition to housing the cam bolts assemblies, can serve as inlet or outlet ducts for an enclosed cooling system to deliver cool air to the electronic modules. Also from an aesthetic standpoint each outer panel can be provided with a covering element which can also serve as a means for mounting metering devices.

While the specification is considered to set forth the preferred embodiment of the invention, it will be obvious to those skilled in the art that various changes and modifications may be made therein without departing from the disclosed inventive concept and it is intended that all such changes and modifications embrace the true scope and spirit of the invention.

What is claimed is:

1. A mechanism providing an interlocked connection between an extensible chassis outer panel and a cabinet formed with a cavity comprising:

means for guiding and frictionally holding the extensible chassis within said cabinet having first portions carried on peripheral extremes of said outer panel and mating opposed portions carried on said cabinet; means for locking said extensible chassis within said cabinet having longitudinal elements carried on said outer panel and a plurality of keepers disposed on said cabinet for receiving portions of said longitudinal elements;

means for operating the locking means pivotally joined to said longitudinal elements;

means for displacing said extensible chassis; and actuating means coupled to the operating means and the displacing means for simultaneously controlling coaction of said portions of said longitudinal elements and said keepers, overcoming a frictional force of said first portions and said mating opposed portions, and providing a selective bidirectional force on said chassis, upon having said chassis entirely within said cabinet, insuring a secure said interlocked connection between said chassis and said cabinet outer panel to substantially isolate the chassis from the ambient effects of shock and vibration and permitting ease in withdrawing and inserting said chassis by said actuating means.

2. A mechanism according to claim 1 in which said guiding and holding means are a plurality of tapered pins and pin keepers, said tapered pins being peripherally disposed on said outer panel and facing said cavity and said pin keepers being peripherally disposed on the cavity opening and being positioned in a slight off-center relationship to said tapered pins to provide the guiding of said chassis and said frictional force.

3. An apparatus accordng to claim 2 in which said means for displacing includes;

a pair of bidirectional slotted cams, each cam mounted on opposite sides of said cavity opening and having a break strike and a close strike;

a pair of roller pin arms, each arm disposed on opposite sides of said outer panel, and a pair of roller pins, each pin carried on a separate one of said arms and being in a linearly opposed relationship to separate ones of said slotted cams; and said actuating means is a U-shaped handle pivotally mounted on said outer panel and secured to said arms to direct said roller pins into said slotted cams, whereupon raising said handle forces said roller pins against their break strikes to exert a pushing force on said break strikes to overcome a withdrawing said frictional force and lowering said handle forces said roller pins against their respective close strikes to exert a pulling force on said close strikes to overcome an inserting said frictional force.

4. A mechanism according to claim 2 in which said locking means includes:

a pair of parallel cam bolt assemblies longitudinally mounted on said outer panel; and a plurality of bolt keepers longitudinally disposed on opposite sides of the cavity opening; and said operating means is a pair of push rods each pivotally connected to said handle and a separate cam bolt assembly to provide longitudinal movement for enabling operative engagement and disengagement with said bolt keepers.

5. A mechanism according to claim 4 in which each cam bolt assembly includes a longitudinally extending camming bar provided with a plurality of spaced diagonal cam slots, a guide slot permitting only said longitudinal movement by said camming bar, and a plurality of bolts each provided with a follower nub disposed in a separate one of said cam slots, mounted to insure lateral movement inwardly and outwardly of said outer panel, and disposed to operatively lock within a separate bolt keeper when cammed outwardly by said camming bar and to unlock when cammed inwardly by said bar, and said diagonal cam slots in one camming bar disposed oppositely to said diagonal slots in the other camming bar to impart simultaneous said lateral movement in opposite directions to associated bolts of each bar for enabling said operative engagement and disengagement with said keepers.

6. A mechanism according to claim 3 in which said locking means includes:

a pair of cam bolt assemblies mounted on said outer panel, each having, a longitudinally extending camming bar provided with spaced diagonal cam slots, a guide slot permitting only longitudinal movement of said camming bar, and a plurality of bolts each provided with a follower nub disposed in a separate one of said cam slots and mounted to insure lateral cammed movement inwardly and outwardly of said outer panel; and a plurality of bolt keepers longitudinally disposed on opposite sides of said cavity opening and cooperatively spaced to receive said bolts; and said operating means is a pair of push rods pivotally connected to said handle and each said camming bar to impart bidirectional said longitudinal movement when said handle is raised and lowered for providing said lateral cammed movement of said bolts, and said diagonal cam slots in one camming bar are oppositely disposed to said diagonal slots in the other camming bar to impart simultaneous said lateral cammed movement in opposite directions to their associated bolts enabling selective locking and unlocking of the bolts and bolt keepers.

References Cited

UNITED STATES PATENTS

| | | | |
|---|---|---|---|
| 2,514,246 | 7/1950 | Knox | 312—320 X |
| 2,609,268 | 9/1952 | Nye | 312—320 |
| 2,897,033 | 7/1959 | Ford | 312—320 |
| 3,054,023 | 9/1962 | Blecker et al. | 312—320 |
| 3,116,959 | 1/1964 | Abodeely | 312—320 X |
| 3,367,732 | 2/1968 | Beye | 312—320 |

JAMES T. McCALL, Primary Examiner

U.S. Cl. X.R.

312—320